(12) United States Patent
Kim

(10) Patent No.: US 11,248,955 B2
(45) Date of Patent: Feb. 15, 2022

(54) POLARIZATION MEASUREMENT WITH INTERFERENCE PATTERNS OF HIGH SPATIAL CARRIER FREQUENCY

(71) Applicant: Industrial Cooperation Foundation Chonbuk National University, Jeonju-si (KR)

(72) Inventor: Daesuk Kim, Jeonju-si (KR)

(73) Assignee: INDUSTRIAL COOPERATION FOUNDATION CHONBUK NATIONAL UNIVERSITY, Jeollabuk-Do (KR)

( * ) Notice: Subject to any disclaimer, the term of this patent is extended or adjusted under 35 U.S.C. 154(b) by 52 days.

(21) Appl. No.: 16/536,709

(22) Filed: Aug. 9, 2019

(65) Prior Publication Data

US 2020/0049557 A1 Feb. 13, 2020

(30) Foreign Application Priority Data

Aug. 10, 2018 (KR) .................. 10-2018-0093605
Jul. 23, 2019 (KR) .................. 10-2019-0088908

(51) Int. Cl.
*G01J 3/08* (2006.01)
*G01J 3/02* (2006.01)
(Continued)

(52) U.S. Cl.
CPC .............. *G01J 3/08* (2013.01); *G01J 3/0224* (2013.01); *G01J 3/12* (2013.01); *G01J 3/447* (2013.01); *G01J 3/4531* (2013.01)

(58) Field of Classification Search
CPC .... G01J 3/08; G01J 3/0224; G01J 3/12; G01J 3/447; G01J 3/4531; G01J 4/04
See application file for complete search history.

(56) References Cited

U.S. PATENT DOCUMENTS 4,298,283 A * 11/1981 Makosch ............... G01B 11/26
356/495
7,046,371 B2 * 5/2006 De Lega ............... G01B 9/0209
356/497
(Continued)

FOREIGN PATENT DOCUMENTS

JP 2009-294154 A 12/2009
KR 10-0937219 B1 1/2010
(Continued)

OTHER PUBLICATIONS

Daesuk Kim, et al., "Robust snapshot interferometric spectropolarimetry", Optics Letters, vol. 41, No. 10, May 15, 2016.
(Continued)

*Primary Examiner* — Hwa Andrew Lee
(74) *Attorney, Agent, or Firm* — Harness, Dickey & Pierce, P.L.C.

(57) ABSTRACT

The present inventive concepts relate to an inspection apparatus that snapshots an interference image pattern having a high spatial carrier frequency produced from a one-piece off-axis polarimetric interferometer and that precisely and promptly measures a Stokes vector including spatial polarimetric information. The inspection apparatus dynamically measure in real-time a two-dimensional polarization information without employing a two-dimensional scanner.

17 Claims, 12 Drawing Sheets

(51) Int. Cl.
*G01J 3/12* (2006.01)
*G01J 3/447* (2006.01)
*G01J 3/453* (2006.01)

(56) References Cited

U.S. PATENT DOCUMENTS

| | | |
|---|---|---|
| 9,267,879 B2 | 2/2016 | Ko et al. |
| 10,132,686 B1 | 11/2018 | Kim et al. |
| 2009/0213386 A1 | 8/2009 | LeBlanc et al. |
| 2010/0033730 A1* | 2/2010 | Kim .................. G01B 9/02083 356/479 |
| 2019/0049302 A1 | 2/2019 | Kim |

FOREIGN PATENT DOCUMENTS

| | | |
|---|---|---|
| KR | 101005179 B1 | 1/2011 |
| KR | 2017/0031642 A | 3/2017 |
| KR | 10-1812608 | 12/2017 |
| WO | WO-20170135641 A1 | 8/2017 |

OTHER PUBLICATIONS

Mitsuo Takeda, et al., "Fourier-transform method of fringepattern analysis for computer-based topography and interferometry", Journal of the Optical Society of America, vol. 72, No. 1, Jan. 1982.

Daesuk Kim, et al., "One-piece polarizing interferometer for ultra-fast spectroscopic polarimetry", Scientific Reports, pp. 1-9, Apr. 12, 2019.

M. G. Moharam, et al., "Stable implementation of the rigorous coupled-wave analysis for surface-relief gratings: enhanced transmittance matrix approach", Journal of the Optical Society of America A, vol. 12, pp. 1077-1086, 1995.

Daesuk Kim, et al., "Calibration of a snapshot phase-resolved polarization-sensitive spectral reflectometer", Optics Letters, vol. 38, pp. 4829-4832, 2013.

Vamara Dembele, et al., "Dynamic spectro-polarimeter based on a modified Michelson interferometric scheme", Optics Express, vol. 24, No. 13, Jun. 27, 2016.

Vamara Dembele, et al, "Dynamic Spectroscopic Ellipsometry based on a One-piece Polarizing Interferometric Scheme" Divison of mechanical System Engineering, pp. 1-8.

* cited by examiner

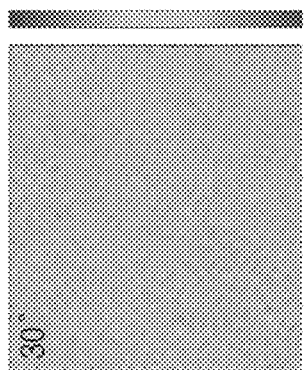
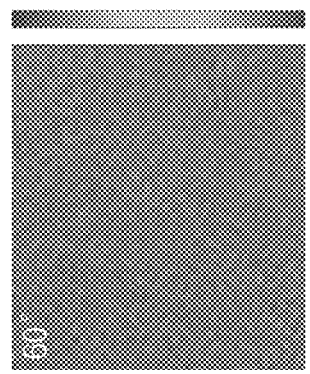
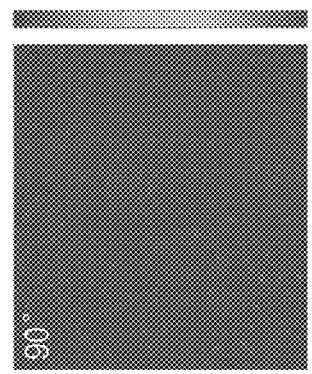
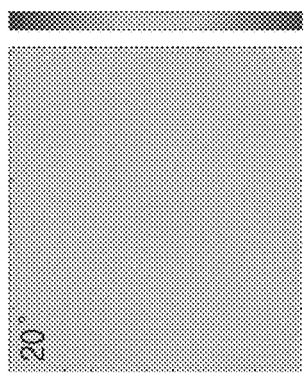
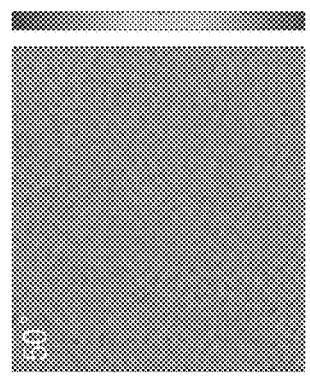
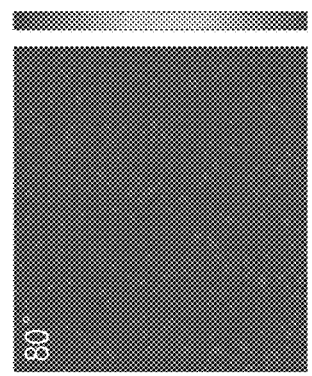
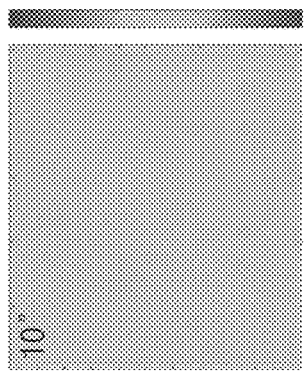
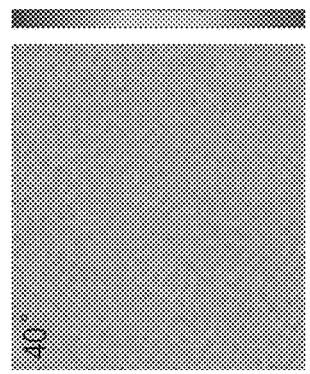
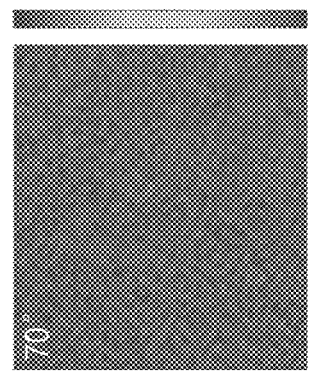
FIG. 10A

POLARIZATION MEASUREMENT WITH INTERFERENCE PATTERNS OF HIGH SPATIAL CARRIER FREQUENCY

CROSS-REFERENCE TO RELATED APPLICATION

This U.S. nonprovisional application claims priority under 35 U.S.C § 119 to Korean Patent Application Nos. 10-2018-0093605 filed on Aug. 10, 2018 and 10-2019-0088908 filed on Jul. 23, 2019 in the Korean Intellectual Property Office, the entire contents of which are hereby incorporated by reference.

BACKGROUND

The present inventive concepts relate to an inspection apparatus and an inspection method, and more particularly, to an inspection apparatus and an inspection method that measure an image of a measured object.

Imaging technology has been widely used to investigate and study physical phenomena changed in real-time, and may be applied as various diagnosis and inspection tools. Polarization-based imaging technology is one of high resolution and high precision measurement technique applicable to diverse fields.

Most of polarization measurement technique requires either mechanically rotational polarizer mechanism or electronic polarization modulation device. However, the polarization measurement technique which employs mechanical mechanism or electronic polarization modulation has a disadvantage of complex hardware configuration and long measurement time.

SUMMARY

Some example embodiments of the present inventive concepts provide an inspection apparatus in which a monochromatic light source is used to rapidly measure images by an area imaging unit.

According to some example embodiments of the present inventive concepts, an inspection apparatus may comprise: a light generator that generates a light; a first linear polarizer that linearly polarizes the light; a polarization interferometer that splits the linearly polarized light into a first light and a second light and that allows the first light and the second light to have spatial phase difference information; a second linear polarizer that receives the first light and the second light passing through or reflecting on a measured object and that linearly polarizes the first light and the second light to produce an interference image pattern with a spatial carrier frequency including anisotropic information of the measured object; and an image sensing module that captures the interference image pattern from the second linear polarizer.

The first and second linear polarizers may have a rotation angle of 45 degrees.

In certain embodiments, the polarization interferometer may include: a polarizing beam splitter that splits the linearly polarized light into the first light and the second light and that has a first surface and a second surface on which the first light and the second light are respectively incident, the first and second surfaces being adjacent to each other; a first mirror on the first surface; and a second mirror on the second surface.

In certain embodiments, the first mirror and the second mirror may have an angle deviated from perpendicular.

In certain embodiments, the deviation angle may be 0.02° to 0.1°.

In certain embodiments, the inspection apparatus may further comprise a first non-polarizing beam splitter between the first linear polarizer and the polarizing beam splitter.

In certain embodiments, the inspection apparatus may further comprise a second non-polarizing beam splitter between the first non-polarizing beam splitter and the measured object.

In certain embodiments, the second linear polarizer may be disposed on one side of the second non-polarizing beam splitter.

In certain embodiments, the inspection apparatus may further comprise a collimating lens that receives and collimates the light from the light generator.

In certain embodiments, the inspection apparatus may further comprise a light-receiving lens between the second linear polarizer and the image sensing module.

In certain embodiments, the light from the light generator may be a monochromatic light.

According to some example embodiments of the present inventive concepts, an inspection apparatus may comprise: a light generator that generates a light; a first linear polarizer that linearly polarizes the light; a beam splitter that splits the linearly polarized light into a first light and a second light and that has a first surface and a second surface on which the first light and the second light are respectively incident, the first and second surfaces being adjacent to each other; a first mirror and a second mirror respectively on the first surface and the second surface; a second linear polarizer that receives and linearly polarizes the first light and the second light from the beam splitter; and an image sensing module that captures an interference image from the second linear polarizer. The first mirror and the second mirror may have an angle deviated from perpendicular.

In certain embodiments, the deviation angle may be 0.02° to 0.1°.

In certain embodiments, the beam splitter may be a polarizing beam splitter.

In certain embodiments, the inspection apparatus may further comprise a non-polarizing beam splitter between the first linear polarizer and the polarizing beam splitter.

In certain embodiments, the light from the light generator may be a monochromatic light.

According to some example embodiments of the present inventive concepts, an inspection method may comprise: linearly polarizing a light; splitting the linearly polarized light into a first light and a second light; allowing the first light and the second light to have a spatial phase difference; radiating a measured object with the first light and the second light that have the spatial phase difference; receiving and linearly modulating the first light and the second light from the measured object; and capturing an interference image pattern modulated by the measured object.

In certain embodiments, the light may be a monochromatic light.

In certain embodiments, the first light and the second light may be a P-polarization wave and an S-polarization wave, respectively.

In certain embodiments, the interference image pattern may be captured in a snapshot mode.

In certain embodiments, a wavelength of the light may be variable.

BRIEF DESCRIPTION OF THE DRAWINGS

FIG. 10A illustrates spatial polarimetric phase difference maps of a measured object having different polarization states according to the present inventive concepts.

DETAILED DESCRIPTION OF EMBODIMENTS

The following will now describe some example embodiments of the present inventive concepts in conjunction with the accompanying drawings.

Figure 1:
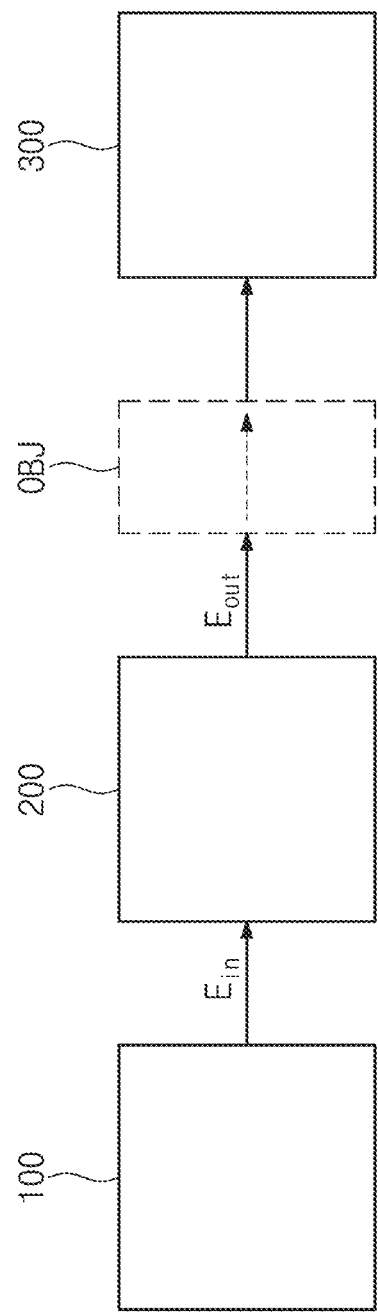
FIG. 1 illustrates a schematic diagram showing an inspection apparatus according to the present inventive concepts.

FIG. 1 illustrates a schematic diagram showing an inspection apparatus according to the present inventive concepts.

Referring to FIG. 1, an inspection apparatus according to the present inventive concepts may include a light source part 100, a polarization modulation part 200, and an analysis part 300.

The light source part 100 may illuminate light. The light source part 100 may radiate a monochromatic light.

A laser beam $E_{in}$ may be illuminated to the polarization modulation part 200. The laser beam may be linearly polarized (e.g., with a rotation angle of 45°) in the polarization modulation part 200. The polarization modulation part 200 may make the linearly polarized laser beam to split into a P-polarization wave and an S-polarization wave, and may allow the P-polarization and S-polarization waves to have a spatial phase difference. For example, at least one of the P-polarization and S-polarization waves that are linearly polarized perpendicularly to each other may be modulated to have the spatial phase difference. As discussed above, the polarization modulation part 200 may generate a high spatial carrier frequency having the spatial phase difference.

A measured object OBJ may be irradiated with an output field $E_{out}$ having the high spatial carrier frequency. The measured object OBJ may have polarization anisotropy. The polarization anisotropy of the measured object OBJ may provide amplitude modulation and phase modulation to light that passes through or reflects on the measured object OBJ.

The light from the measured object OBJ may be incident on the analysis part 300 and then linearly polarized (e.g., with a rotation angle of 45°). Accordingly, the P-polarization and S-polarization waves may interfere with each other to generate an interference image pattern that has the high spatial carrier frequency including anisotropic polarimetric information of the measure object OBJ.

The analysis part 300 may capture the interference image pattern in a snapshot mode without drive mechanism, which may result in generation of a two-dimensional image. Further, the analysis part 300 may measure in real-time a Stokes vector including spatial polarimetric parameters of the measured object OBJ.

Figure 2:
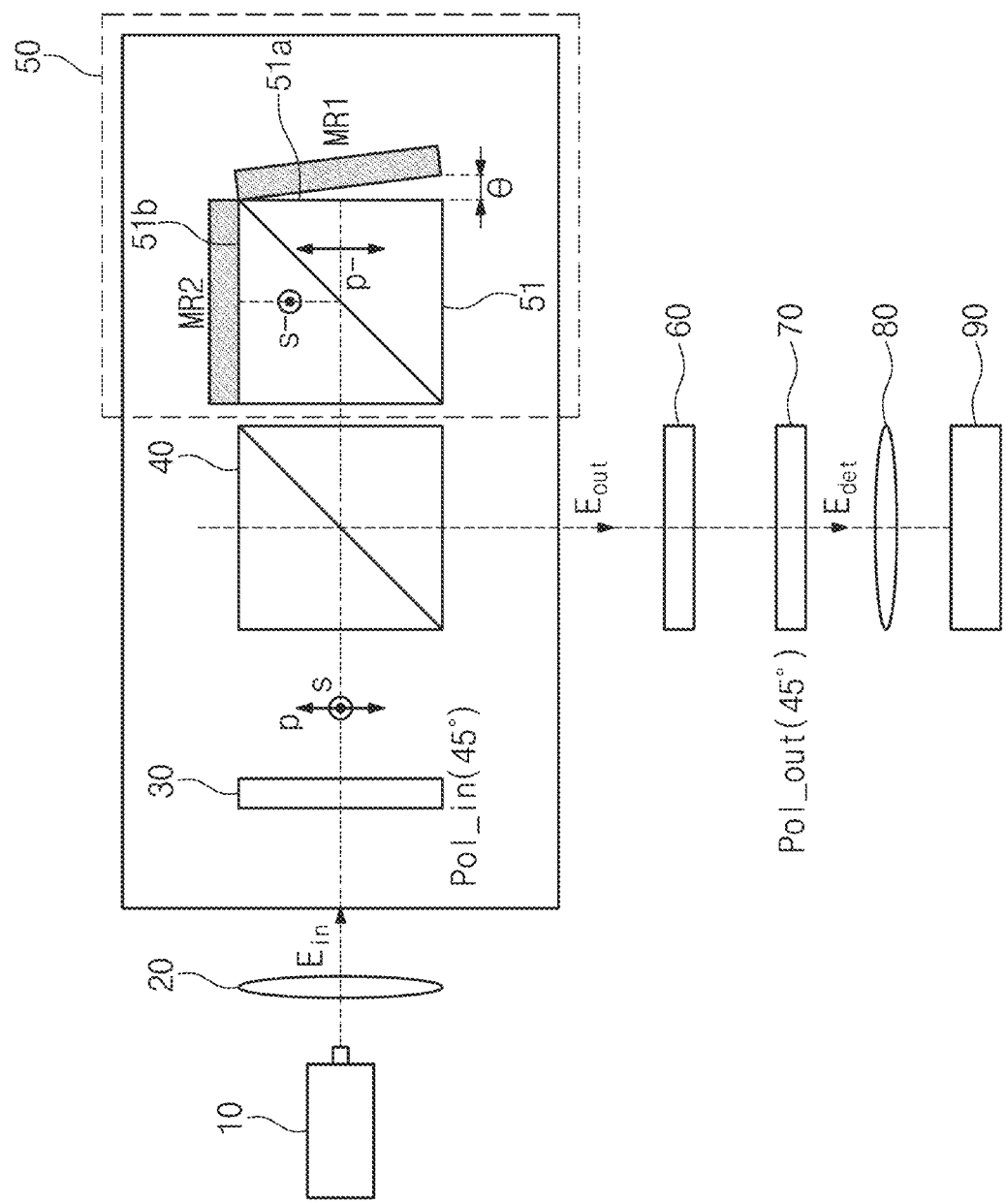
FIG. 2 illustrates a simplified diagram showing an inspection apparatus according to some example embodiments of the present inventive concepts.

FIG. 2 illustrates a simplified diagram showing an inspection apparatus according to some example embodiments of the present inventive concepts. Omission will be made to avoid duplicate explanation of components and functions discussed with reference to FIG. 1.

Referring to FIG. 2, an inspection apparatus according to some example embodiments of the present inventive concepts may include a light generator 10, a collimating lens 20, a first linear polarizer 30, a first non-polarizing beam splitter 40, a polarization interferometer 50, a second linear polarizer 70, an imaging lens 80, and an image sensing module 90.

The light source part 100 of FIG. 1 may include the light generator 10 and the collimating lens 20, the polarization modulation part 200 of FIG. 1 may include the first linear polarizer 30, the first non-polarizing beam splitter 40 and the polarization interferometer 50, and the analysis part 300 of FIG. 1 may include the second linear polarizer 70, the imaging lens 80 and the image sensing module 90.

Referring to FIG. 2, the light generator 10 may generate a laser beam. The light generator 10 may be a monochromatic laser that produces a single wavelength light. Alternatively, the laser beam from the light generator 10 may be a tunable laser capable of wavelength modulation.

The laser beam may be irradiated to the collimating lens 20. The collimating lens 20 may convert the laser beam into a collimated light.

The laser beam from the collimating lens 20 may be irradiated to the first linear polarizer 30. The first linear polarizer 30 may linearly polarizes the laser beam (e.g., with a polarization direction of 45°).

The first non-polarizing beam splitter 40 may be disposed between the first linear polarizer 30 and the polarization interferometer 50. The first non-polarizing beam splitter 40 may provide the polarization interferometer 50 with the linearly polarized laser beam from the first linear polarizer 30. In addition, the first non-polarizing beam splitter 40 may provide a measured object 60 with a first light and a second light that are reflected from mirrors MR1 and MR2 of the polarization interferometer 50.

The polarization interferometer 50 may be a one-piece off-axis polarization interferometer by which the laser beam undergoes polarization modulation. The polarization interferometer 50 may include a polarizing splitter 51, a first mirror MR1, and a second mirror MR2. The polarizing splitter 51 may be a polarizing beam splitter.

The polarizing splitter 51 may split the linearly polarized laser beam into a first light and a second light. The first light and the second light may respectively be a P-polarization wave and an S-polarization wave. Alternatively, the first light and the second light may respectively be an S-polarization wave and a P-polarization wave, but for convenience of description, the following will discuss an example in which the first light and the second light are a P-polarization wave and an S-polarization wave, respectively. The polarizing splitter 51 may have a first surface 51*a* and a second surface 51*b* that are adjacent and perpendicular to each other. The polarization interferometer 50 may include the first mirror MR1 disposed on the first surface 51*a* and the second mirror MR2 disposed on the second surface 51*b*.

The polarizing splitter 51 may allow the first light to pass therethrough and to enter the first mirror MR1, and may allow the second light to reflect thereon and to enter the second mirror MR2. The first mirror MR1 and the second mirror MR2 are not perpendicular to each other. The first mirror MR1 and the second mirror MR2 may have an off-axis angle θ deviated from perpendicular. For example, the first mirror MR1 may have an off-axis angle θ tilted from the perpendicular line to the wave propagation direction and the second mirror MR2 may perpendicular to the wave propagation direction. The off-axis angle θ may be about 0.01° to 1° (preferably, 0.02° to 0.1°), and may be changed depending on a wavelength of the laser beam. Because the first mirror MR1 is tilted at the off-axis angle θ, the polarization interferometer 50 may generate a high spatial carrier frequency and may spatially modulate a polarization signal. The first mirror MR1 may be tilted in a perpendicular direction to that shown. In addition, the first mirror MR1 may be tilted in both of the two directions. The first mirror MR1 is tilted as shown in figures, but the tilting may act on the second mirror MR2 or both of the first and second mirrors MR1 and MR2.

In such a configuration, the polarization interferometer 50 may split the linearly polarized laser beam into the P-polarization wave and the S-polarization wave, and may allow the P-polarization and S-polarization waves to have a spatial phase difference. For example, the polarization interferometer 50 may create a high spatial carrier frequency having a continuous spatial phase shift.

The first light and the second light that are output from the polarization interferometer 50 may pass via the first non-polarizing beam splitter 40 through the measured object 60. The measured object 60 may have polarization anisotropy. The measured object 60 may have, for example, nano-patterns. The polarization anisotropy of the measured object 60 may provide amplitude modulation and phase modulation to light travelling away from the measured object 60.

The analysis part 300 may receive the light that passes through the measured object 60. For example, the second linear polarizer 70 of the analysis part 300 may receive the P-polarization wave and the S-polarization wave that pass through the measured object 60, and may polarize the P-polarization wave and the S-polarization wave (e.g., with a rotation angle of) 45°. Accordingly, the P-polarization wave and the S-polarization wave may interfere with each other to generate an interference image pattern that has the high spatial carrier frequency including polarimetric information of the measured object 60.

The interference image pattern may enter the image sensing module 90 after passing through the imaging lens 80 (see $E_{det}$). The image sensing module 90 may capture the interference image pattern in a snapshot mode without drive mechanism, and may measure in real-time a Stokes vector including spatial polarimetric parameters of the measured object 60.

As mentioned above, because the first mirror MR1 and the second mirror MR2 are integrally attached to the polarizing splitter 51, the off-axis angle θ may not be affected by disturbance due to external vibration and the like. Hence, the high spatial carrier frequency may be kept constant in all cases, and the snapshot mode may precisely measure the interference image pattern. Moreover, because the interference image pattern is captured in the snapshot mode, a two-dimensional measurement may be performed.

Figure 3:
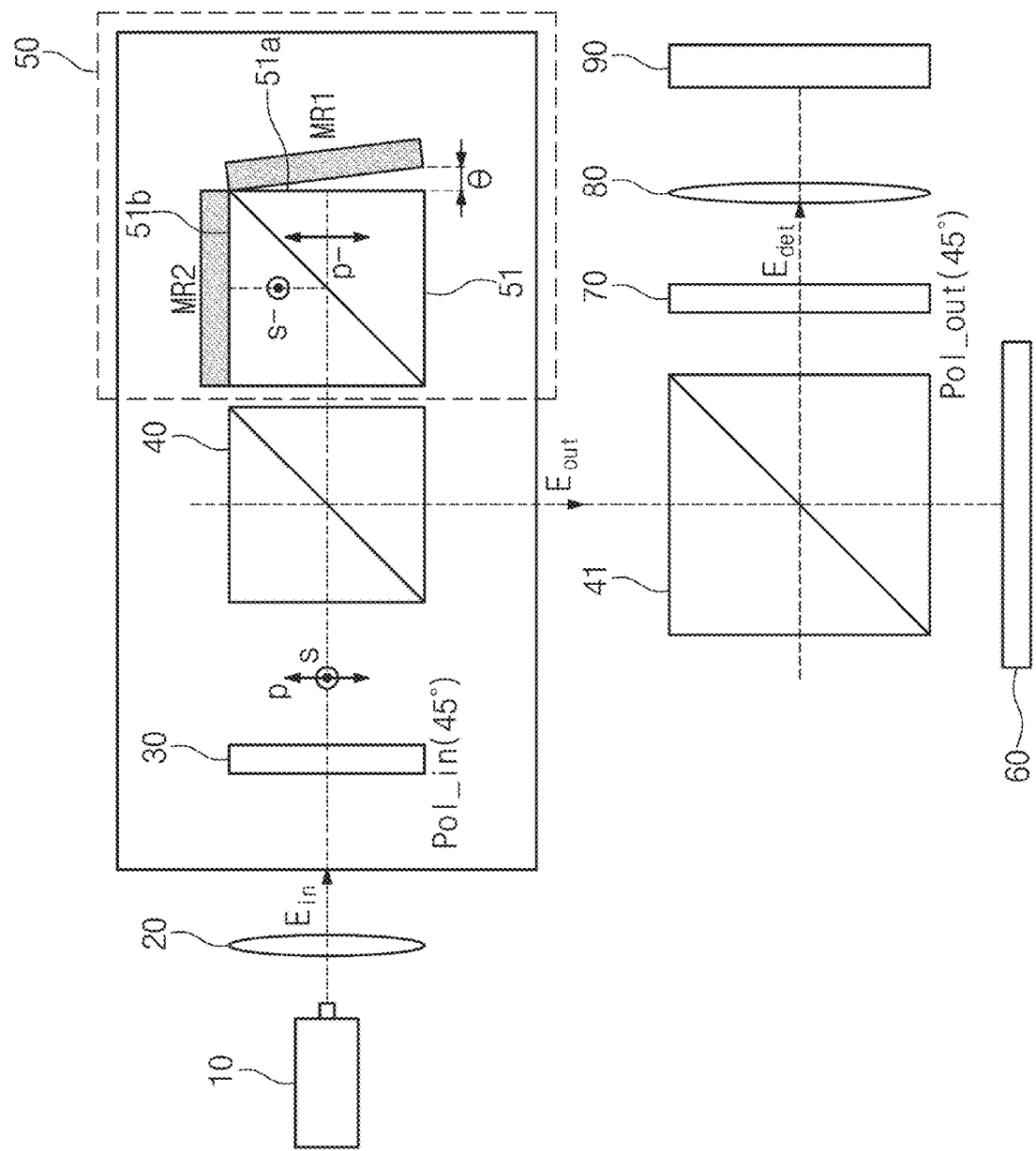
FIG. 3 illustrates a simplified diagram showing an inspection apparatus according to some example embodiments of the present inventive concepts.

FIG. 3 illustrates a simplified diagram showing an inspection apparatus according to some example embodiments of the present inventive concepts. Omission will be made to avoid duplicate explanation of components and functions discussed with reference to FIG. 2.

Referring to FIG. 3, a second non-polarizing beam splitter 41 may further be included in the inspection apparatus according to some example embodiment of the present inventive concepts.

The light source part 100 of FIG. 1 may include the light generator 10 and the collimating lens 20, the polarization modulation part 200 of FIG. 1 may include the first linear polarizer 30, the first non-polarizing beam splitter 40 and the polarization interferometer 50, and the analysis part 300 of FIG. 1 may include the second non-polarizing beam splitter 41, the second linear polarizer 70, the imaging lens 80 and the image sensing module 90.

The first light and the second light that are output from the polarization interferometer 50 may be reflected on the measured object 60. The measured object 60 may be a reflective polarization anisotropic object. The measured object 60 may have, for example, nano-patterns. The second non-polarizing beam splitter 41 may provide the second linear polarizer 70 with the reflected first and second lights (e.g., the P-polarization and S-polarization waves). The first light and the second light that are incident on the second linear polarizer 70 may be linearly polarized (e.g., with a rotation angle of 45°) to create an interference image pattern, and the image sensing module 90 may receive the first light and the second light that pass through the imaging lens 80.

Figure 4:
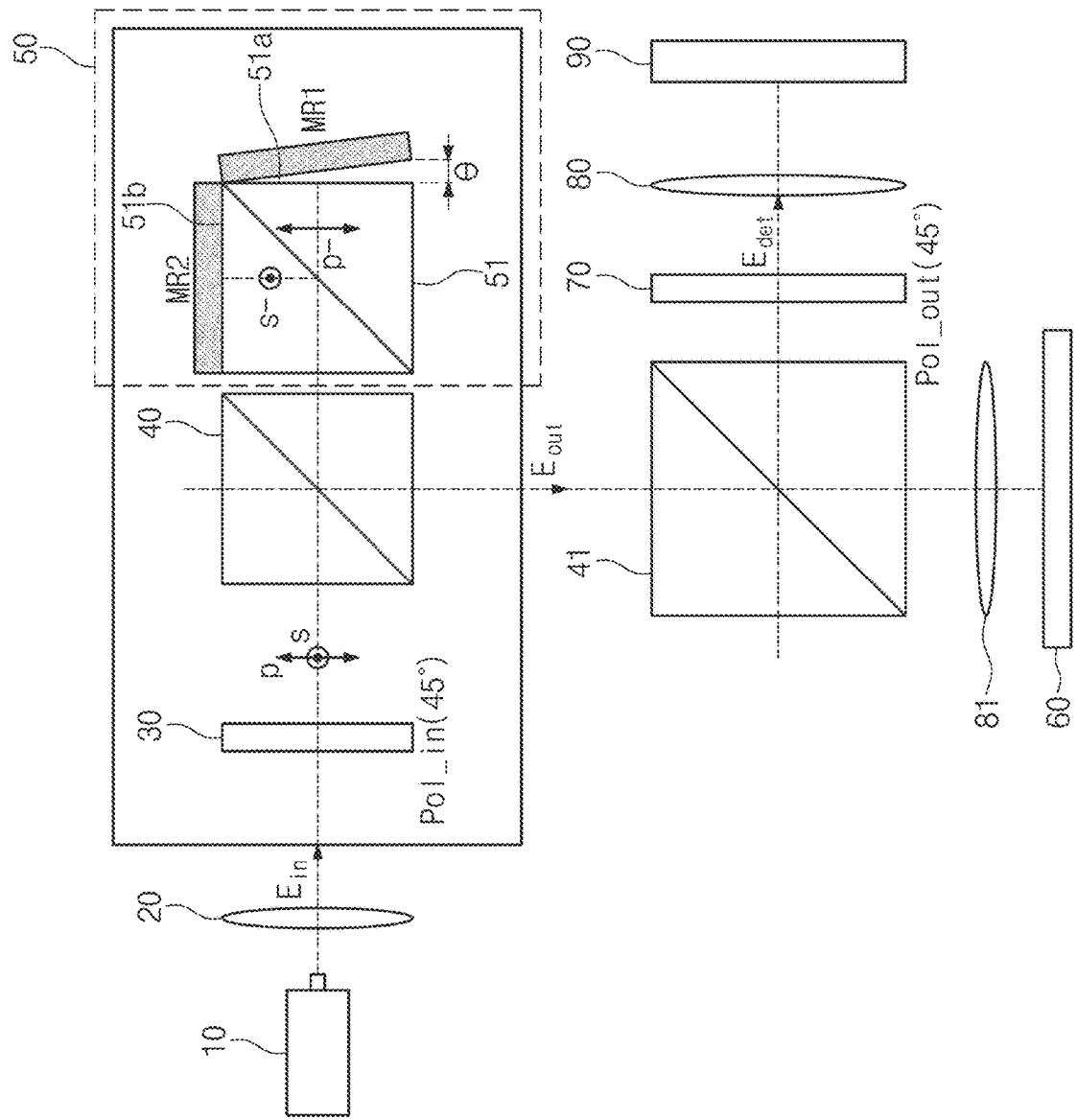
FIG. 4 illustrates a simplified diagram showing an inspection apparatus according to some example embodiments of the present inventive concepts.

FIG. 4 illustrates a simplified diagram showing an inspection apparatus according to some example embodiments of the present inventive concepts. Omission will be made to avoid duplicate explanation of components and functions discussed with reference to FIG. 3.

Referring to FIG. 4, an objective lens 81 may further be included in the inspection apparatus according to some example embodiment of the present inventive concepts.

The light source part 100 of FIG. 1 may include the light generator 10 and the collimating lens 20, the polarization modulation part 200 of FIG. 1 may include the first linear polarizer 30, the first non-polarizing beam splitter 40 and the polarization interferometer 50, and the analysis part 300 of FIG. 1 may include the second non-polarizing beam splitter 41, the second linear polarizer 70, the imaging lens 80, the objective lens 81, and the image sensing module 90.

The objective lens 81 may be additionally provided to observe a fine region of the reflective measured object 60. The objective lens 81 may be a microscope that magnifies and measures the reflective measured object 60 at large magnification. The magnification of the microscope may be deliberately changed by users, and is not limited to a specific magnifying power.

Figure 5:
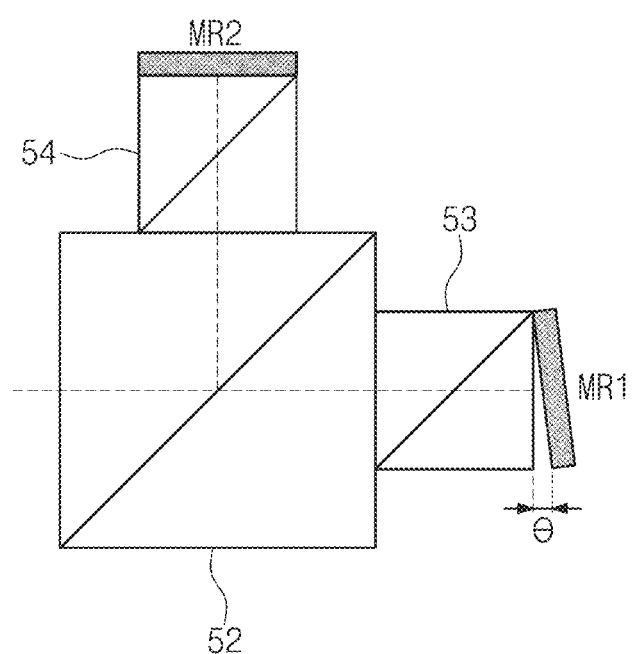
FIG. 5 illustrates an example of a polarizing splitter depicted in FIGS. 2 to 4.

FIG. 5 illustrates an example of the polarizing splitter 51 according to some example embodiments of the present inventive concepts. The polarizing splitter 51 discussed above with reference to FIGS. 2 to 4 is a polarizing beam splitter, and the polarizing splitter 51 of FIG. 5 may include a non-polarizing beam splitter.

Referring to FIG. 5, the polarizing splitter 51 may include a non-polarizing beam splitter 52, a first sub-linear polarizer 53, and a second sub-linear polarizer 54. The non-polarizing beam splitter 52 may split a laser beam, and the two sub-linear polarizers 53 and 54 having polarization directions perpendicular to each other may be disposed on two paths of the split laser beams. The mirrors MR1 and MR2 may be provided on the two sub-linear polarizers 53 and 54.

Figure 6:
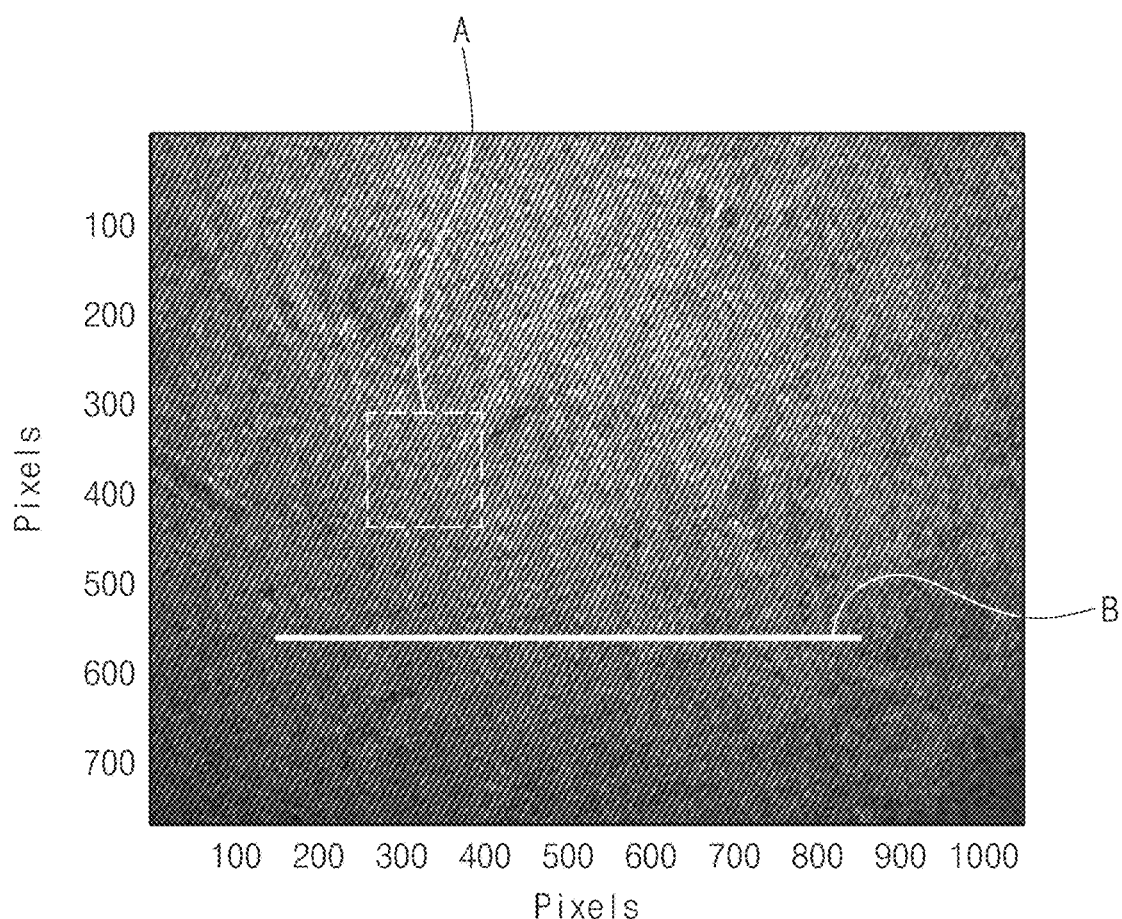
FIG. 6 illustrates an example of an interference image pattern generated from an inspection apparatus according to the present inventive concepts.

FIG. 6 illustrates an example of an interference image pattern generated by an inspection apparatus according to the present inventive concepts. A test was conducted under a condition that the measured object 60 of FIG. 2 was replaced with a transmissive achromatic quarter-wave plate (QWP). An optic axis angle of the OWP was set to −45° as reference.

Referring to FIG. 6, an inspection apparatus according to the present inventive concepts may capture an interference image pattern in a snapshot mode and thus may perform an area measurement. A polarization interference fringe is seen from the high spatial carrier frequency.

It may be possible to extract spatial polarimetric parameters of the measured object OBJ from the interference image pattern. The following will discuss a method in which the inspection apparatus of FIG. 2 is used to extract the spatial polarimetric parameters.

The input wave light $E_{in}$ incident on the polarization interferometer 50 may be expressed as follows.

$$E_{in}(x, y) = \begin{bmatrix} E_x(x, y) \\ E_y(x, y) \end{bmatrix} = \begin{bmatrix} u(x, y)e^{j\xi(x,y)} \\ v(x, y)e^{j\eta(x,y)} \end{bmatrix}$$

Here, j is an operator which follows the rule of $j^2=-1$. In the equation above, u and v represent amplitudes of the input wave light along x-axis and y-axis, respectively. The symbols $\xi$ and $\eta$ represent phases of the input wave light along the x-axis and y-axis, respectively. The P-polarization wave and S-polarization wave are oriented toward the x-axis and the y-axis, respectively.

The output field $E_{out}$ from the polarization interferometer 50 is expressed as follows.

$$E_{out}(x,y)=E_1(x,y)+E_2(x,y)$$

where, $E_1(x,y)$ and $E_2(x,y)$ are respectively related to a P-polarization path and an S-polarization path. The terms $E_1(x,y)$ and $E_2(x,y)$ meet at an exit of the polarization interferometer 50, and may be represented as follows.

$$E_1(x, y) = B_N B_P M_1 B_P B_N P(45)E_{in}(x, y)$$
$$= \frac{1}{\sqrt{2}} \begin{bmatrix} u'(x, y)e^{j[2\pi\lambda^{-1}(k_{x1}x+k_{y1}y)+\xi'(x,y)]} \\ 0 \end{bmatrix}$$

and, $$E_2(x, y) = B_N B_S M_2 B_S B_N P(45)E_{in}(x, y)$$
$$= \frac{1}{\sqrt{2}} \begin{bmatrix} 0 \\ v'(x, y)e^{j[2\pi\lambda^{-1}(k_{x2}x+k_{y2}y)+\eta'(x,y)]} \end{bmatrix}$$

Here, P(45) is referred as Jones matrix of the linear polarizer aligned with a rotation angle of 45°. $B_N$ is Jones matrix of a non-polarizing beam splitter used in the polarization interferometer 50, and $B_P$ and $B_S$ are Jones matrices of a polarizing beam splitter for the P-polarization and S-polarization paths, respectively, used in the polarization interferometer 50. The symbols $M_1$ and $M_2$ stand for Jones matrices of the mirrors MR1 and MR2 whose reflection coefficients are $r_1$ and $r_2$, respectively. The symbol $\lambda$ refers to a wavelength of a light source. The symbols $k_{x1}$ and $k_{y1}$ are referred to components of a wave vector travelled along the P-polarization path of the polarization interferometer 50. The symbols $k_{x2}$ and $k_{y2}$ are referred to components of a wave vector travelled along the S-polarization path of the polarization interferometer 50.

The symbols u' and v' denote newly defined unknown amplitude terms of $E_1(x,y)$ and $E_2(x,y)$, respectively. $\xi'$ and $\eta'$ denote newly defined unknown phase terms of $E_1(x,y)$ and $E_2(x,y)$, respectively.

A spatial optical path difference in the polarization interferometer 50 may become a condition to generate spatial interference fringes. Eventually, the output field $E_{out}$ passes through the anisotropic measured object shown in FIG. 2, and an output light wave $E_{det}^{obj}$ measured in the image sensing module 90 may be expressed as follows.

$$E_{det}^{obj}(x,y)=E_{det}^{1,obj}(x,y)+E_{det}^{2,obj}(x,y)$$

where, $$E_{det}^{1,obj}(x,y)=\tfrac{1}{2}u'(x,y)|t_P(x,y)|e^{j[2\pi\lambda^{-1}(k_{x1}x+k_{y1}y)+\xi'(x,y)+\delta_P(x,y)]}$$

$$E_{det}^{2,obj}(x,y)=\tfrac{1}{2}v'(x,y)|t_S(x,y)|e^{j[2\pi\lambda^{-1}(k_{x2}x+k_{y2}y)+\eta'(x,y)+\delta_S(x,y)]}$$

Here, $E_{det}^{1,obj}$ and $E_{det}^{2,obj}$ indicate output light waves related to P-polarization and S-polarization, respectively. In the equations above, represent amplitudes of complex Fresnel transmission coefficients for P-polarization and S-polarization, respectively, when passing through the measured object. The symbols $\delta_p$ and $\delta_s$ represent spatial phase differences for P-polarization and S-polarization, respectively, when passing through the measured object.

The interference image pattern resulting from the interference between the P-polarization wave and the S-polarization wave may be expressed as follows.

$$I(x,y)=(E_{det}^{1,obj}(x,y)+E_{det}^{2,obj}(x,y))(E_{det}^{1,obj}(x,y)+E_{det}^{2,obj}(x,y))^*$$

In a case of transmission of the anisotropic measured object, the interference image pattern is expressed as follows.

$$I^{obj}(x, y) =$$
$$(|E_{det}^{1,obj}||t_P|)^2 + (|E_{det}^{2,obj}||t_S|)^2 + 2^Y|E_{det}^{1,obj}E_{det}^{2,obj}| \times |t_P||t_S|\cos[\Phi^{obj}(x, y)] =$$
$$(\alpha|t_P|)^2 + (\beta|t_S|)^2 + 2Y(x, y)\alpha\beta|t_P||t_S|\cos[\Phi^{obj}(x, y)]$$

where, $$\Phi^{obj}(x,y)=2\pi\lambda^{-1}(k_1x+k_2y)+[\xi'(x,y)-\eta'(x,y)]+[\delta_P(x,y)-\delta_S(x,y)]$$

Here, $k_1=k_{x1}-k_{x2}$ and $k_2=k_{y1}-k_{y2}$, which $k_1$ and $k_2$ denote differences in wave vector along the P-polarization path and the S-polarization path, respectively. In the equation above, $\gamma(x,y)$ represents a spatial coherence function. A spatial phase function $\Phi^{obj}(x,y)$ may be extracted by using the 2D Fourier transform applied in a spatial frequency domain.

To measure a calibrated spatial polarimetric phase difference $\Delta(x,y)$ of the measured object OBJ, a calibration step may be needed to obtain a reference spatial phase function $\Phi^{ref}(x,y)$ in the absence of the measured object. The following equation may express a reference output light wave $E_{det}^{ref}$ measured in the image sensing module 90 in the absence of the measured object shown in FIG. 2.

$$E_{det}^{ref}(x,y)=E_{det}^{1,ref}(x,y)+E_{det}^{2,ref}(x,y)$$

where, $$E_{det}^{1,ref}(x,y)=\tfrac{1}{2}u'(x,y)e^{j[2\pi\lambda^{-1}(k_{x1}x+k_{y1}y)+\xi'(x,y)]}$$

$$E_{det}^{2,ref}(x,y)=\tfrac{1}{2}v'(x,y)e^{j[2\pi\lambda^{-1}(k_{x2}x+k_{y2}y)+\eta'(x,y)]}$$

In a case of non-transmission of the measured object, the interference image pattern is expressed as follows.

$$I^{ref}(x,y)=|E_{det}^{1,ref}|^2+|E_{det}^{2,ref}|^2+2\gamma|E_{det}^{1,ref}||E_{det}^{2,ref}|\times \cos[\Phi^{ref}(x,y)]$$

where, $$\Phi^{ref}(x,y)=2\pi\lambda^{-1}(k_1x+k_2y)+[\xi'(x,y)-\eta'(x,y)]$$

In a way similar to that above, the 2D Fourier transform may be used to extract the reference spatial phase function $\Phi^{ref}(x,y)$. When the reference spatial phase function $\Phi^{ref}(x,y)$ is obtained in the absence of the measured object, it may be possible as described below to measure the spatial polarimetric phase difference $\Delta(x,y)$ between P-polarization and S-polarization that are created by the anisotropic measured object.

$$\Delta(x, y) = \Phi^{obj}(x, y) - \Phi^{ref}(x, y)$$
$$= \delta_P(x, y) - \delta_S(x, y)$$

Here, the calibration step for obtaining $\Phi^{ref}(x,y)$ is required only once, and because $\Phi^{ref}(x,y)$ is a fixed value inherent to a measurement system, $\Phi^{ref}(x,y)$ may be applied to $\Delta(x,y)$ of any measured object OBJ after the calibration step.

A spatial polarimetric amplitude ratio $\Psi(x,y)$ between P-polarization and S-polarization may be acquired by a method similar to that of the spatial polarimetric phase difference $\Delta(x,y)$.

In a case of transmission of the anisotropic measured object, the interference image pattern is expressed as follows.

$$I^{obj}(x,y)=P_{obj}^{DC}+2\gamma P_{obj}^{AC}\cos[\Phi^{obj}(x,y)]$$

where, $P_{obj}^{DC}=(\alpha|t_P|)^2+(\beta|t_S|)^2$, $P_{obj}^{AC}=\alpha\beta|t_P||t_S|$, $\alpha=|E_{det}^{1,obj}|$, $\beta=|E_{det}^{2,obj}|$ Finally, $$\alpha|t_P| = \frac{\sqrt{P_{obj}^{DC}+2P_{obj}^{AC}}+\sqrt{P_{obj}^{DC}-2P_{obj}^{AC}}}{2}$$

$$\beta|t_S| = \frac{\sqrt{P_{obj}^{DC}+2P_{obj}^{AC}}-\sqrt{P_{obj}^{DC}-2P_{obj}^{AC}}}{2}$$

and these terms $\alpha|t_P|$ and $\beta|t_S|$ are used to obtain the spatial polarimetric amplitude ratio $\Psi(x,y)$ as follows.

$$\Psi(x, y) = \tan^{-1}\left[\frac{|t_P|}{|t_S|}\right]$$
$$= \tan^{-1}\left[\frac{\beta}{\alpha}\cdot\frac{\sqrt{P_{obj}^{DC}+2P_{obj}^{AC}}+\sqrt{P_{obj}^{DC}-2P_{obj}^{AC}}}{\sqrt{P_{obj}^{DC}+2P_{obj}^{AC}}-\sqrt{P_{obj}^{DC}-2P_{obj}^{AC}}}\right]$$

The following will verify the feasibility of the inspection apparatus according to the present inventive concepts in conjunction with FIGS. 6 to 11B.

Figure 7:
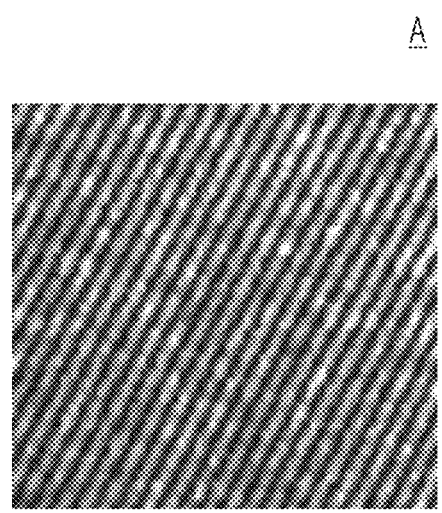
FIG. 7 illustrates an enlarged view showing section A of FIG. 6.

FIG. 6 shows the interference image pattern that is measured from the inspection apparatus according to the present inventive concepts. FIG. 7 illustrates an enlarged view showing section A of FIG. 6. FIG. 7 depicts an interference fringe that is polarization-modulated from the high spatial carrier frequency.

Figure 8:
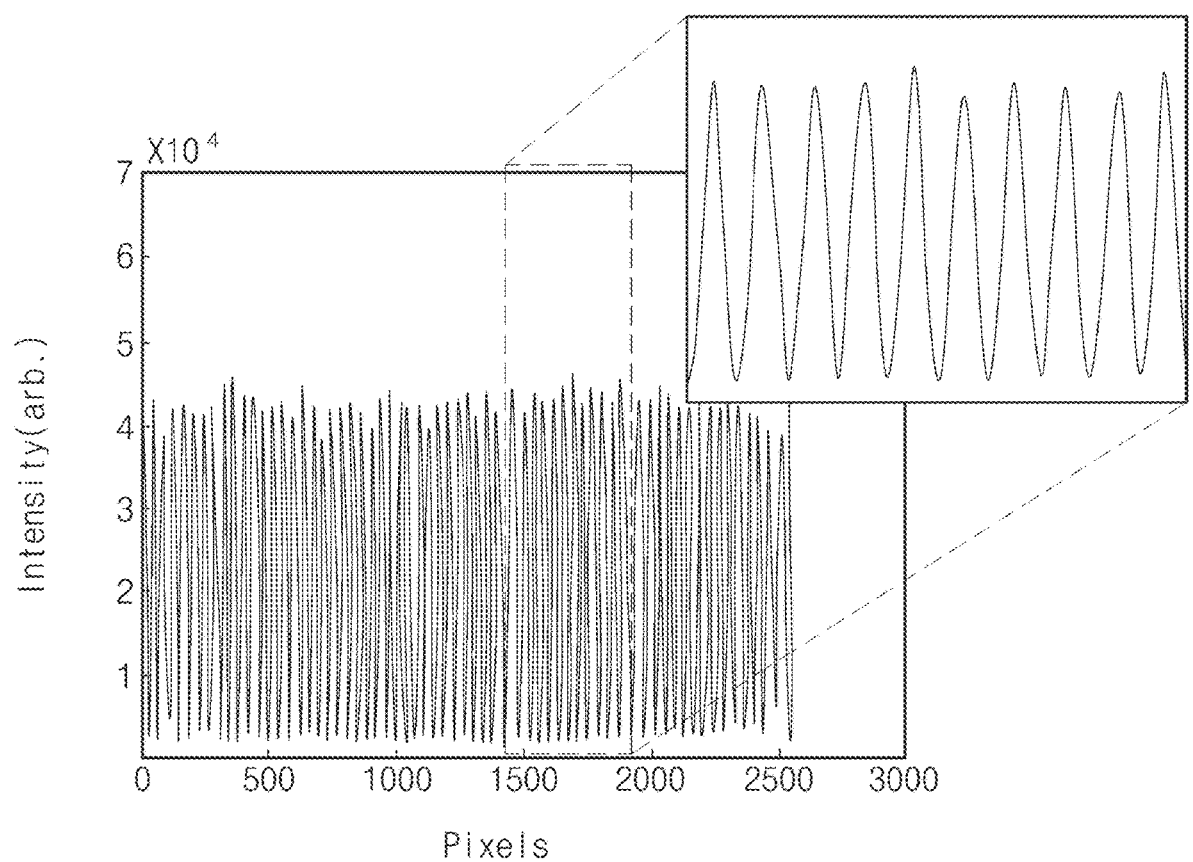
FIG. 8 illustrates an example of a one-dimensional surface profile of an interference image pattern according to the present inventive concepts.

FIG. 8 is an example of a one-dimensional surface profile of the interference image pattern shown in FIG. 6. FIG. 8 shows a line intensity profile along line B depicted in the interference image pattern of FIG. 6. As discussed above, the 2D fast Fourier transform (2D-FFT) algorithm is applied to a raw interference image pattern in the spatial frequency domain, so that unwanted DC and AC terms may be filtered out.

Figure 9A:
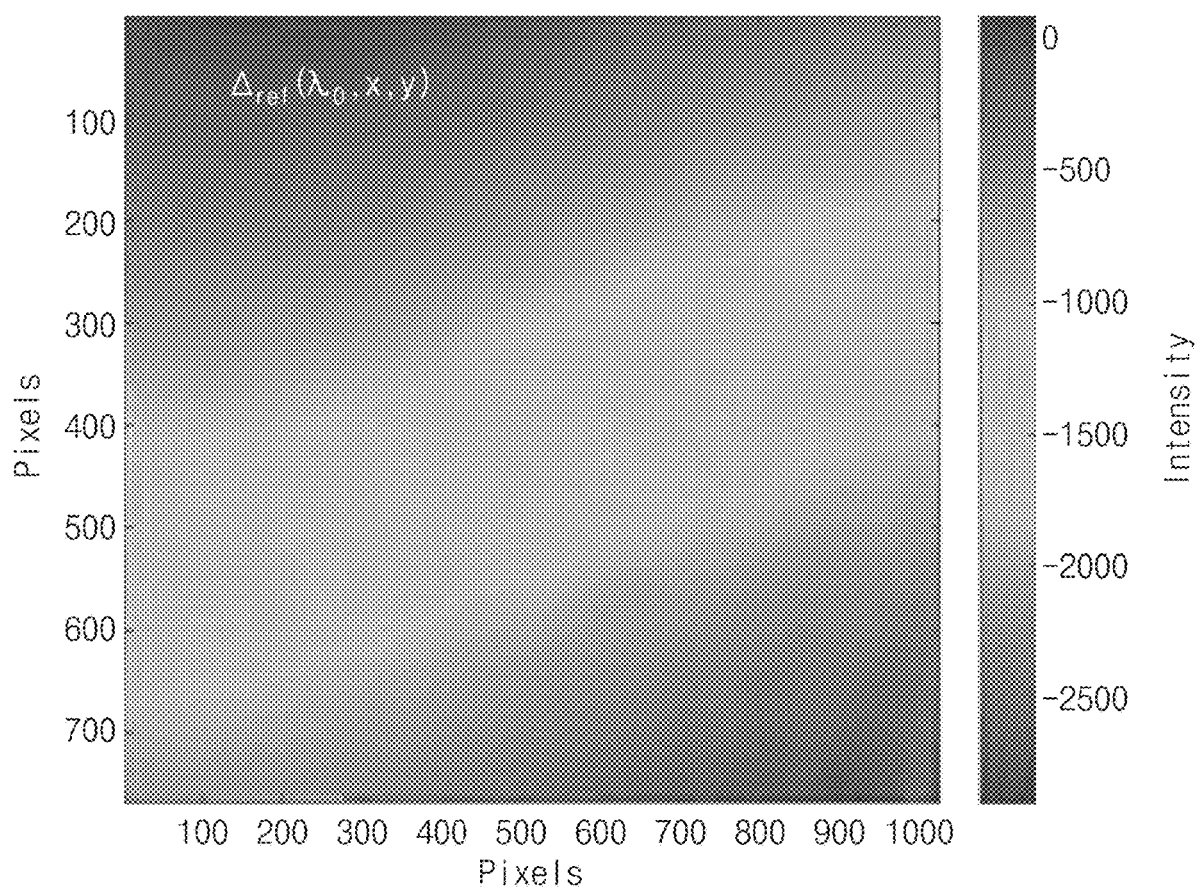
FIGS. 9A and 9B illustrate examples of spatial phase information extracted from an interference image pattern according to present inventive concepts.

FIG. 9A is an example of spatial phase information extracted from the interference image pattern of FIG. 6. FIG. 9A shows phase information of the interference image pattern at the optical angle of −45° of the QWP. For example, FIG. 9A depicts a measured result of spatial polarization states produced after the output field $E_{out}$ passed through the quarter-wave plate (QWP) which took the place of the measured object. In verification, the spatial phase information at the optic axis angle of −45° shown in FIG. 9A may correspond to the reference spatial phase function $\Phi^{ref}(x,y)$ discussed above.

Figure 9B:
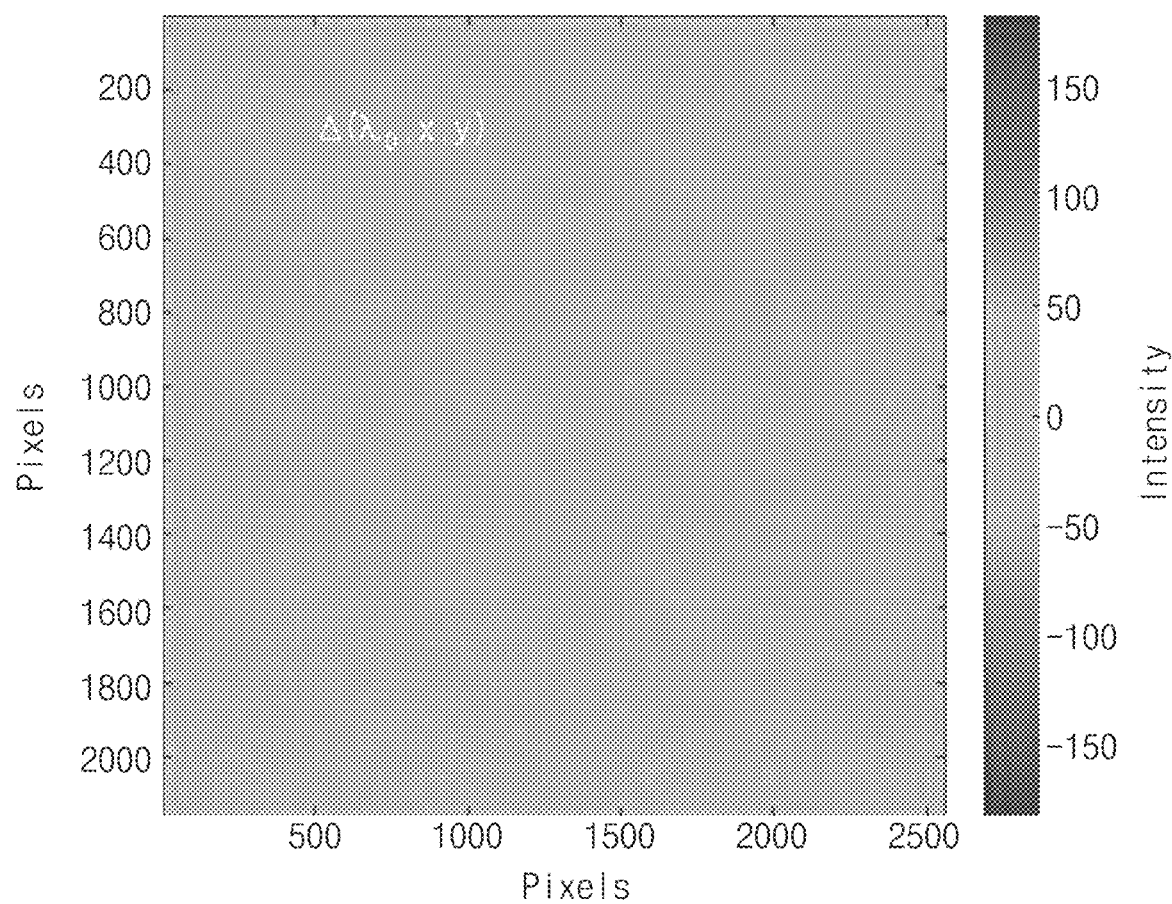

Afterwards, an interference image pattern was measured from the QWP whose optic axis angle was changed as much as 10° from −45°, and then used to extract spatial phase information. Referring to FIG. 9B, the spatial polarimetric phase difference $\Delta(x,y)$ could be acquired from the spatial phase function $\Phi^{obj}(x,y)$ obtained as mentioned above.

Figure 10B:
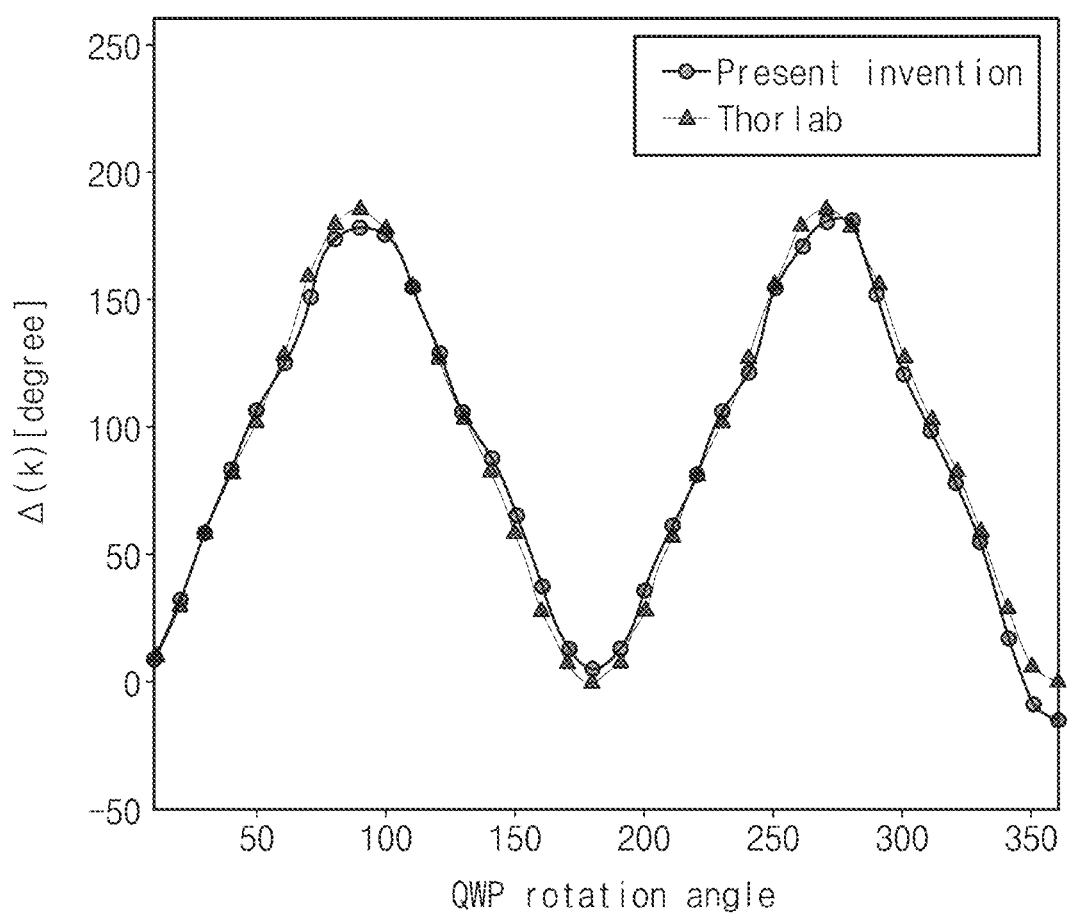
FIG. 10B illustrates a graph showing a comparison between spatial polarimetric phase differences at a central position of FIG. 10A and those obtained using a commercial imaging polarimeter.

FIG. 10A shows spatial polarimetric phase differences $\Delta(x,y)$ measured from the QWP whose optic axis angle was varied from −45° at an interval of 10°. In FIG. 10B, dots indicate variations in $\Delta(x,y)$ at central pixels of FIG. 10A. It shows that polarization phase difference values are continuously changed, and it was found that this result was almost the same as that of a commercial polarization measurement apparatus (e.g., a polarimeter commercially available from Thorlabs, Inc.).

Figure 11A:
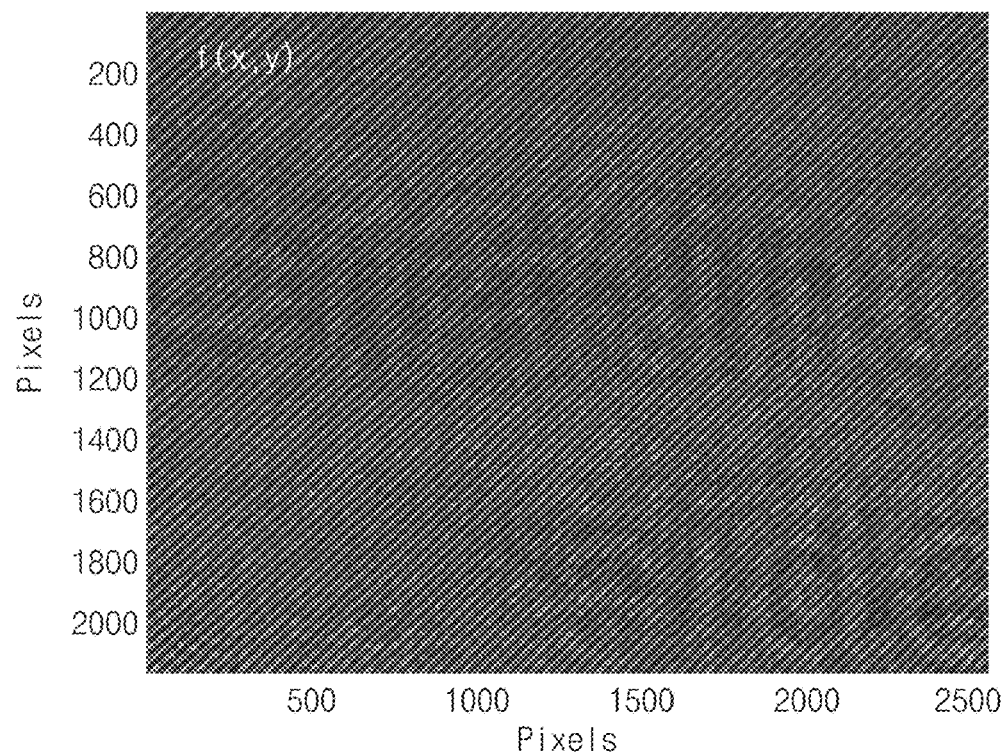
FIG. 11A illustrates an example of an interference image pattern produced from a measured object having nano-patterns by using an inspection apparatus according to the present inventive concepts.
Figure 11B:
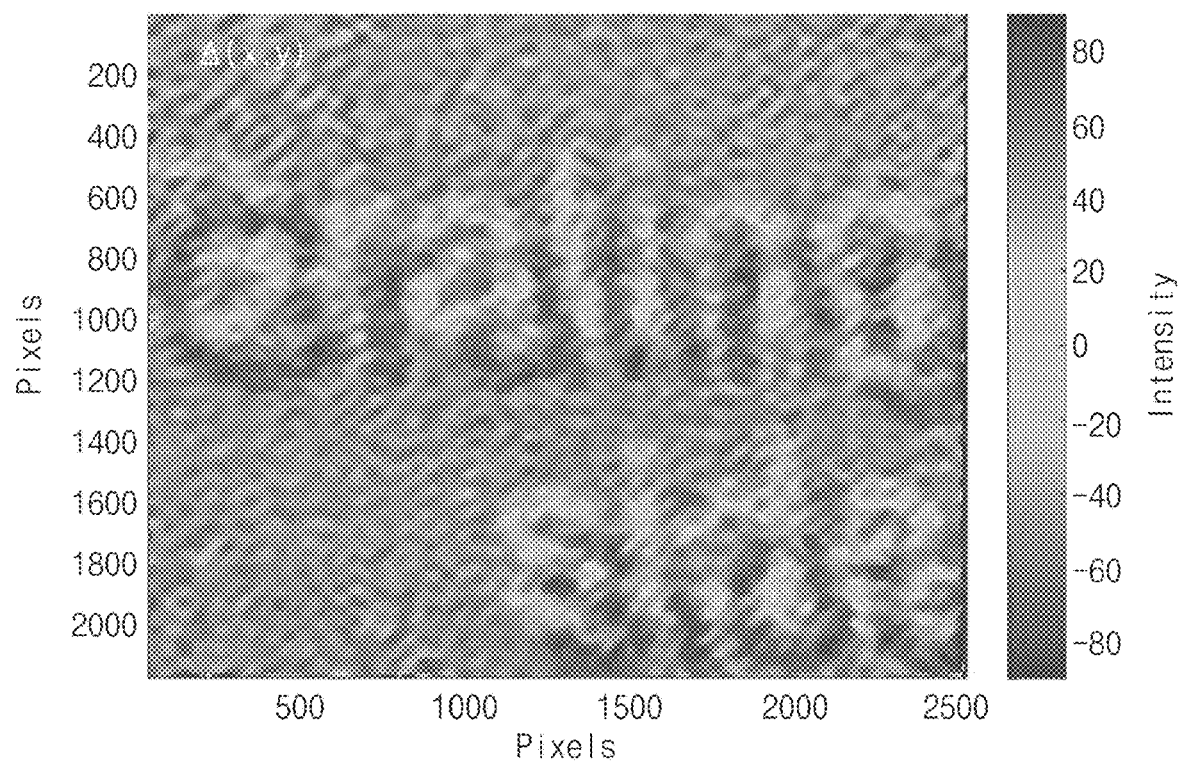
FIG. 11B illustrates a measurement result of spatial polarimetric phase difference obtained from the interference image pattern of FIG. 11A.

FIGS. 11A and 11B respectively illustrate an interference image pattern produced from a measured object having nano-patterns and a measurement result of two-dimensional spatial polarimetric phase differences, which pattern and result are obtained using the inspection apparatus according to the present inventive concepts. FIG. 11A shows I(x,y) that indicates an interference image pattern obtained by the image sensing module 90, and FIG. 11B illustrates $\Delta(x,y)$ that denotes a measurement result of two-dimensional spatial polarimetric phase difference obtained from a measured object having nano-patterns that are inscribed in the form of characters such as Grating side. The polarimetric phase difference did not occur on regions where no characters are inscribed, but occurred on regions having the inscribed characters. According to the present inventive concepts, a real-time measurement may be conducted to obtain rapidly varying polarization image informations that are two-dimensionally distributed as shown in figures.

Film and nano-pattern uniformity distribution can be precisely measured from the spatial polarimetric phase difference $\Delta(x,y)$ and the spatial polarimetric amplitude ratio $\Psi(x,y)$ that are obtained as discussed above. Further, the inspection apparatus according to the present inventive concepts may measure imaging information in real-time in a snapshot mode without mechanical rotating mechanism or electronic signal modulation, and therefore two-dimensional image information of a measured object may be measured by area imaging unit in real-time at high speed (e.g., several tens to hundreds of Hz) without employing a two-dimensional scanner used in conventional polarimeters that measure by point measuring unit. In addition, because a wavelength of light can be changed at high speed, it may be possible to acquire spectroscopic polarization image cubic information of $\Delta(x,y,\lambda)$ and $\Psi(x,y,\lambda)$ in a wide wavelength range, with the result that two-dimensional film thickness and refractive index may be measured by area imaging unit at high speed.

According to the present inventive concepts, imaging information may be measured in real-time in a snapshot mode without mechanical rotating mechanism or electronic signal modulation. Image information of a measured object may be measured by two-dimensional area imaging unit in real-time at high speed without adopting a two-dimensional scanner used for conventional spectroscopic polarimeters that measure by point measuring unit.

What is claimed is:

1. An inspection apparatus, comprising:
a light generator configured to generate a light;
a first linear polarizer configured to linearly polarize the light;
a polarization interferometer configured to split the linearly polarized light into a first light and a second light and cause the first light and the second light to have spatial phase difference information;
a first non-polarizing beam splitter between the first linear polarizer and the polarizing beam splitter;
a second linear polarizer configured to
receive the first light and the second light passing through or reflecting on a measured object, and
linearly polarize the first light and the second light to produce an interference image pattern with a spatial carrier frequency including anisotropic information of the measured object; and
an image sensor configured to capture the interference image pattern from the second linear polarizer,
wherein the polarization interferometer includes:
a polarizing beam splitter configured to split the linearly polarized light into the first and the second light, the polarizing beam splitter including a first surface and a second surface configured to receive the first light and the second light, respectively, the first and second surfaces being adjacent to each other,
a first mirror on the first surface, and
a second mirror on the second surface,
wherein the first mirror and the second mirror are integrally attached to the polarizing beam splitter, and
wherein the first mirror and the second mirror have an angle deviated from perpendicular.

2. The inspection apparatus of claim 1, wherein the deviation angle is 0.02° to 0.1°.

3. The inspection apparatus of claim 1, further comprising a second non-polarizing beam splitter between the first non-polarizing beam splitter and the measured object.

4. The inspection apparatus of claim 3, wherein the second linear polarizer is disposed on one side of the second non-polarizing beam splitter.

5. The inspection apparatus of claim 1, further comprising a collimating lens configured to receive and collimate the light from the light generator.

6. The inspection apparatus of claim 1, further comprising a light-receiving lens between the second linear polarizer and the image sensor.

7. The inspection apparatus of claim 1, wherein the light generator is configured to generate monochromatic light.

8. An inspection apparatus, comprising:
a light generator configured to generate a light;
a first linear polarizer configured to linearly polarize the light;
a beam splitter configured to split the linearly polarized light into a first light and a second light, the beam splitter including a first surface and a second surface configured to receive the first light and the second light, respectively, the first and second surfaces being adjacent to each other;
a first mirror and a second mirror respectively on the first surface and the second surface;
a second linear polarizer configured to receive and linearly polarize the first light and the second light from the beam splitter; and
an image sensor configured to capture an interference image from the second linear polarizer,
wherein an angle between the first mirror and the second mirror is deviated from perpendicular, and
wherein the first mirror and the second mirror are integrally attached to the beam splitter.

9. The inspection apparatus of claim 8, wherein the deviation angle is 0.02° to 0.1°.

10. The inspection apparatus of claim 8, wherein the beam splitter is a polarizing beam splitter.

11. The inspection apparatus of claim 10, further comprising a non-polarizing beam splitter between the first linear polarizer and the polarizing beam splitter.

12. The inspection apparatus of claim 8, wherein the light generator is configured to generate a monochromatic light.

13. An inspection method, comprising:
linearly polarizing a light by a first linear polarizer;
splitting the linearly polarized light that passes through the first linear polarizer and a first non-polarizing beam splitter into a first light and a second light by a polarization interferometer
causing, by the polarization interferometer, the first light and the second light to have a spatial phase difference;
radiating a measured object with the first light and the second light that have the spatial phase difference, and each of which is reflected by the first non-polarizing beam splitter;
receiving and linearly polarizing, by a second linear polarizer, the first light and the second light from the measured object; and
capturing an interference image pattern of the measured object from the linearly polarized first and second lights
wherein the polarization interferometer includes:
a polarizing beam splitter configured to split the linearly polarized light into the first light and the second light, the polarizing beam splitter including a first surface and a second surface configured to receive the first light and the second light, respectively, the first and second surfaces being adjacent to each other;
a first mirror on the surface; and
a second mirror on the second surface,
wherein the first mirror and the second mirror are integrally attached to the polarizing beam splitter, and
wherein the first mirror and the second mirror have an angle deviated from perpendicular.

14. The inspection method of claim 13, wherein the light is a monochromatic light.

15. The inspection method of claim 13, wherein the first light and the second light are a P-polarization wave and an S-polarization wave, respectively.

16. The inspection method of claim 13, wherein the interference image pattern is captured in a snapshot mode.

17. The inspection method of claim 13, wherein the light is generated by a light generator, and
wherein the light generator is a tunable laser capable of wavelength modulation.

* * * * *